US008000841B2

(12) United States Patent
Orth

(10) Patent No.: US 8,000,841 B2
(45) Date of Patent: Aug. 16, 2011

(54) POWER MANAGEMENT IN A PROCESS TRANSMITTER

(75) Inventor: Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 1341 days.

(21) Appl. No.: 11/322,662

(22) Filed: Dec. 30, 2005

(65) Prior Publication Data

US 2007/0152645 A1 Jul. 5, 2007

(51) Int. Cl.
*G05D 11/00* (2006.01)

(52) U.S. Cl. ............... 700/297; 700/22; 702/46; 702/65

(58) Field of Classification Search .................... 700/22, 700/286, 297, 298, 299, 301; 702/46, 64
See application file for complete search history.

(56) References Cited

U.S. PATENT DOCUMENTS

| | | | | |
|---|---|---|---|---|
| 3,742,450 | A | 6/1973 | Weller | 375/257 |
| 4,701,938 | A | 10/1987 | Bell | 375/257 |
| 5,187,474 | A | 2/1993 | Kielb et al. | 340/870.18 |
| 5,684,451 | A | 11/1997 | Seberger et al. | 340/310.16 |
| 5,705,978 | A | 1/1998 | Frick et al. | 340/511 |
| 5,787,120 | A | 7/1998 | Louagie et al. | 375/257 |
| 6,182,019 | B1 * | 1/2001 | Wiklund | 702/100 |
| D439,177 | S | 3/2001 | Fandrey et al. | D10/46 |
| D439,178 | S | 3/2001 | Fandrey et al. | D10/46 |
| D439,179 | S | 3/2001 | Fandrey et al. | D10/46 |
| D439,180 | S | 3/2001 | Fandrey et al. | D10/85 |
| D439,181 | S | 3/2001 | Fandrey et al. | D10/46 |
| D441,672 | S | 5/2001 | Fandrey et al. | D10/52 |
| 6,429,786 | B1 | 8/2002 | Bansemir et al. | 340/870.27 |
| 6,457,367 | B1 | 10/2002 | Behm et al. | 73/753 |
| 6,484,107 | B1 | 11/2002 | Roper et al. | 702/50 |
| 6,487,912 | B1 | 12/2002 | Behm et al. | 73/753 |
| 6,504,489 | B1 | 1/2003 | Westfield et al. | 340/870.3 |
| 6,508,131 | B2 | 1/2003 | Frick | 73/756 |
| 6,510,740 | B1 | 1/2003 | Behm et al. | 73/708 |
| 6,511,337 | B1 | 1/2003 | Fandrey et al. | 439/320 |
| 6,516,672 | B2 | 2/2003 | Wang | 73/718 |
| D471,829 | S | 3/2003 | Dennis et al. | D10/85 |
| D472,831 | S | 4/2003 | Dennis et al. | D10/85 |
| 6,546,805 | B2 | 4/2003 | Fandrey et al. | 73/753 |

(Continued)

FOREIGN PATENT DOCUMENTS

DE 37 41 648 12/1987

(Continued)

OTHER PUBLICATIONS

First Office Action for Application No. 200580010070.4, date of filing the application Mar. 7, 2005; Translation provided, 2 pages.

(Continued)

*Primary Examiner* — Kakali Chaki
*Assistant Examiner* — Nathan Laughlin
(74) *Attorney, Agent, or Firm* — Westman, Champlin & Kelly, P.A.

(57) ABSTRACT

An industrial process transmitter for transmitting a process variable on a two-wire process control loop include, a loop current control to control a loop current level on the two-wire process control loop that is related to the process variable. Power is provided to primary circuitry of the process transmitter. A secondary current control circuit limits current delivered to secondary circuitry.

25 Claims, 4 Drawing Sheets

U.S. PATENT DOCUMENTS

| | | | | |
|---|---|---|---|---|
| 6,553,076 | B1 | 4/2003 | Huang | 375/257 |
| 6,568,279 | B2 | 5/2003 | Behm et al. | 73/753 |
| 6,571,132 | B1 | 5/2003 | Davis et al. | 700/2 |
| 6,593,857 | B1 | 7/2003 | Roper et al. | 340/870.3 |
| 6,609,427 | B1 | 8/2003 | Westfield et al. | 73/753 |
| 6,662,662 | B1 | 12/2003 | Nord et al. | 73/715 |
| 6,754,601 | B1 * | 6/2004 | Eryurek et al. | 702/104 |
| 6,765,968 | B1 | 7/2004 | Nelson et al. | 375/257 |
| 6,898,980 | B2 | 5/2005 | Behm et al. | 73/756 |
| 6,961,665 | B2 | 11/2005 | Slezak | 702/61 |
| 7,109,883 | B2 | 9/2006 | Trimble et al. | 340/870.16 |
| 2002/0011115 | A1 | 1/2002 | Frick | 73/718 |
| 2002/0082799 | A1 | 6/2002 | Pramanik | 73/753 |
| 2004/0124854 | A1 * | 7/2004 | Slezak | 324/644 |
| 2004/0184517 | A1 | 9/2004 | Westfield et al. | 375/219 |
| 2005/0056106 | A1 | 3/2005 | Nelson et al. | 73/866.3 |
| 2006/0194547 | A1 | 8/2006 | Davis | 455/69 |

FOREIGN PATENT DOCUMENTS

| | | | |
|---|---|---|---|
| DE | 196 22 295 | | 5/1996 |
| DE | 19622295 | | 11/1997 |
| DE | 102 21 931 | A1 | 5/2002 |
| EP | 0 518 916 | B1 | 2/1991 |
| EP | 0 895 209 | A1 | 2/1999 |
| EP | 0 895 209 | | 3/1999 |
| EP | 1 192 614 | | 1/2003 |
| JP | 5-120595 | | 5/1993 |
| JP | 2003/042881 | | 2/2003 |
| RU | 2111543 | C1 | 5/1998 |
| RU | 98108150 | A | 2/2000 |
| WO | WO 91/13417 | | 9/1991 |
| WO | WO 2004/023423 | | 3/2004 |
| WO | WO 2007/002769 | | 1/2007 |

OTHER PUBLICATIONS

International Preliminary Report and Written Opinion for International Application No. PCT/US2005/007328 filed Mar. 7, 2005. Date of Mailing: Oct. 12, 2006.

International Search Report for International Application No. PCT/US 03/27561, filed Mar. 9, 2003, dated Jun. 15, 2004.

2002 Microchip Technology Inc., "Stand-Alone CAN Controller with SPI™ Interface," pp. 1-75, Mar. 1, 2002.

Rosemount Reference Manual 00809-0100-4022,Rev AA, Jul. 2002, "Model 4600 Oil & Gas Panel Transmitter," 65 pages.

Transmitter Schematic, Sold Jul. 2002, 5 pages.

Notification of Transmittal of the International Search Report and the Written Opinion of the International Searching Authority for International Application No. PCT/US2005/007328 filed Mar. 7, 2005. Date of Mailing: Jan. 12, 2006.

"Notification of Transmittal of the International Search Report and the Written Opinion of the International Searching Authority", PCT/US2006/046932.

Office Action issued for European Patent Application No. 06845048.5 filed Dec. 11, 2006. Office Action date Sep. 25, 2008, 3 pages.

Chinese Office for corresponding Chinese Patent Application No. 200580010070.4, dated Sep. 25, 2009, 5 pgs.

European Office Action from EP Application No. 05724798.3-2213, dated Feb. 4, 2008, 3 pgs.

Decision on Grant for Russian Application No. 2006138032/09(041419), dated Apr. 14, 2008, 12 pages.

Official Action from related Chinese application Serial No. CN 2006800500805, dated Jan. 29, 2010.

Chinese Office Action CN 200580010070.4, dated Jan. 8, 2010, 6 pgs.

Third Chinese Office Action CN 200680015575.4, dated May 11, 2010, 11 pgs.

Invitation to Pay Additional Fees for International Application No. PCT/US2005/007328, filed Mar. 7, 2005; mailed Nov. 8, 2005.

Chinese Office action for corresponding Chinese Patent Application No. 200580010070.4 dated Jan. 8, 2010, 6 pages.

Second Office Action for Chinese Patent Application No. 200680050080.5; 15 pages.

* cited by examiner

POWER MANAGEMENT IN A PROCESS TRANSMITTER

FIELD OF THE INVENTION

The present invention relates generally to industrial process transmitters, and more particularly, to power management in such transmitters.

BACKGROUND OF THE INVENTION

Industrial process transmitters are devices that can be coupled to industrial process equipment and/or conduits and are adapted to measure process parameters, such as pressure, mass flow, flow rate, temperature, and the like. Frequently, such transmitters draw power from a two-wire loop that carries an energy limited loop current, which varies within a range of 4-20 mA. When the current is low (such as 4 mA), a majority of the power available to the transmitter from the loop is used by circuitry within the transmitter to sense a process variable and to generate a process variable output representative of the sensed process variable.

In some configurations, transmitters can utilize primary and secondary process measurements, using multiple sensors or field devices. For instance, to make a mass flow measurement of gas or steam through a pipe, a flowmeter can be used to measure flow rate, and a second sensor can be used to measure the line pressure, for example.

Power delivery to the sensor or field device performing such secondary process measurements contributes to the overall current and power consumption of the system. At low current levels (such as 4 mA), very little power (typically 1 to 2 milliwatts) is available for powering accessory loads and for communicating with feature modules.

SUMMARY

An industrial process transmitter is provided which includes a loop current control to couple to a two-wire process control loop and adapted to control a loop current level based upon a process variable.

Power from the loop is provided to primary circuitry of the process transmitter at a quiescent current level. A databus is configured to couple to secondary circuitry of the transmitter. A secondary current control circuit dynamically limits current delivered to secondary circuitry.

DETAILED DESCRIPTION

In general, industrial process devices contain circuitry for measuring a process parameter and for communicating, for example, with a communications network, such as a 4-20 mA two-wire process control loop. Such transmitter circuitry requires a quiescent current (typically less than 4 mA) for standard operation. Embodiments of the present invention employ a current limiter to limit current provided to secondary circuitry, such as secondary measurement circuitry, sensors, operator interfaces, and the like. The secondary circuitry is coupled to primary circuitry of the transmitter through a databus such as that described in Nelson et al. U.S. Pat. No. 6,765,968 which is incorporated herein by reference. In one embodiment, the current limiter may be used in conjunction with circuitry which provides power-up energization for the secondary circuitry, even when the loop current is at a minimum (such as 4 mA). As used herein, the term primary circuitry refers to sensor and other circuitry contained within a sealed electronics housing of a transmitter, (such as electronics housing 110 in FIG. 1). As used herein, the term secondary circuitry refers to circuitry that is internal or external to the sealed electronics housing that receives energization from the primary circuitry. Example secondary circuitry includes an LCD circuit, local operator interface circuit, or other circuitry contained within a feature module (such as feature module 108 in FIG. 1) that can be coupled to the electronics housing. In another embodiment, the secondary circuitry is a secondary measurement circuit coupled to an industrial process separate from the transmitter (such as secondary device 132 in FIG. 1) over a data and power bus (133 in FIG. 1).

Figure 1:
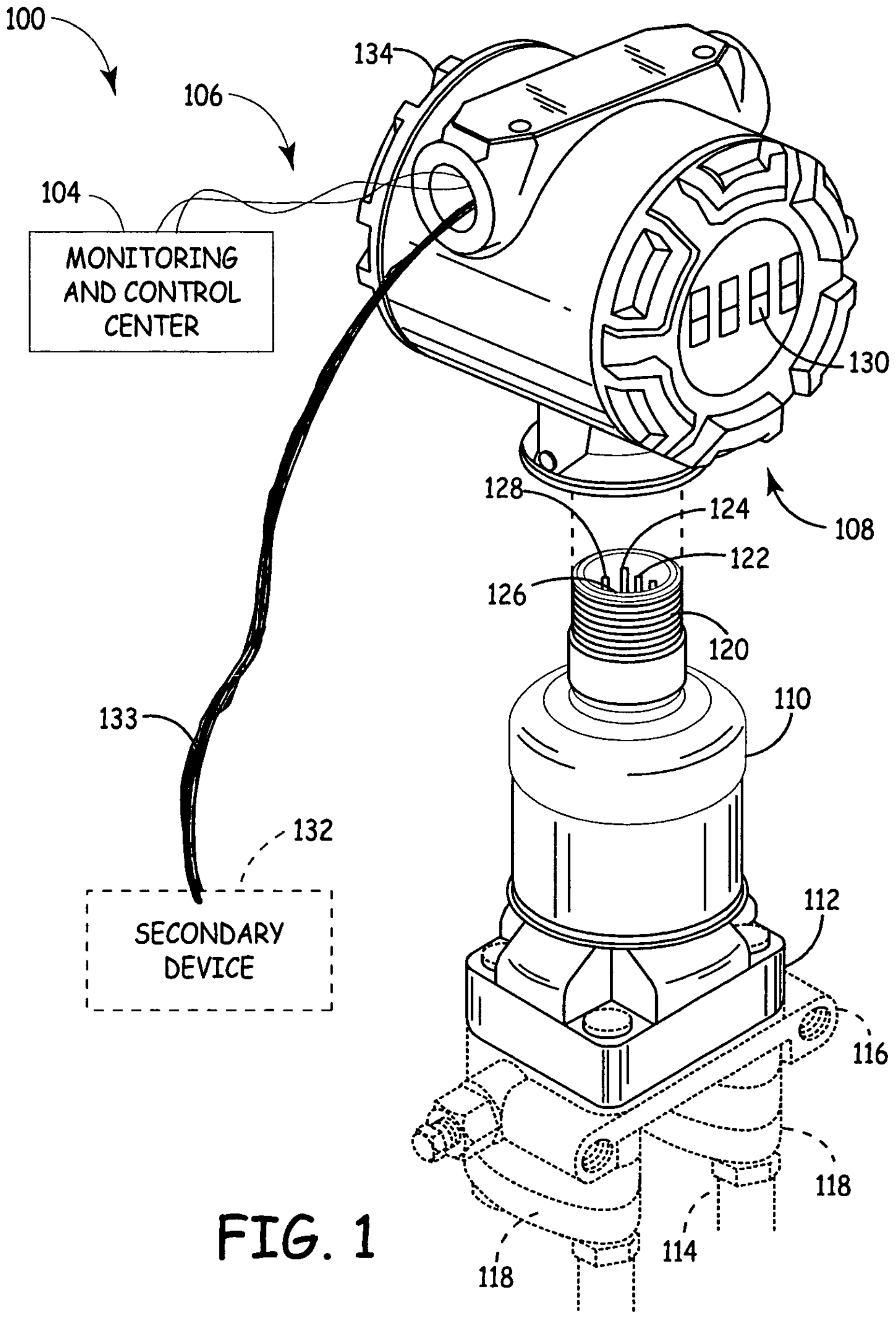
FIG. 1 illustrates an industrial process monitoring and control system according to an embodiment of the present invention.

FIG. 1 illustrates an industrial process monitoring and control system 100, which includes a transmitter 102 coupled to a process monitoring and control center 104 by a two-wire process control loop 106. The process monitoring and control center 104 can be, for example, a control room with one or more computer systems coupled to the network and adapted to communicate with one or more field devices and/or transmitters that are coupled to an industrial process.

The transmitter 102 is a two-wire modular differential pressure transmitter, shown in an exploded view. The transmitter 102 is a two-wire transmitter in the sense that it is an electronic transmitter that uses two wires for signal transmission and power. For example, two-wire process control loops can use 4-20 mA signaling techniques and digital communication techniques, such as HART®, Fieldbus, Profibus, and other communication protocols. The modular differential pressure transmitter 102 is only one example of a suitable process monitoring and control device and is not intended to suggest any limitation as to the scope of use or functionality of the invention.

Transmitter 102 includes a feature module 108, an electronics housing 110, and a process coupling 112. The process coupling 112 can be attached to a pipe or conduit of an industrial process, such as pipe 114, with flange 116 and flange adapter unions 118 shown in phantom.

The transmitter electronics housing 110 is sealed to the pressure sensing module 106 and encloses electronic circuitry (shown in FIG. 2). Housing 110 also includes a connector 120 having contacts including bus contact 122, common contact 124, and loop wiring contacts 126, 128. The bus contact 122 and the common contact 124 couple the circuitry within the electronics housing 110 to any of various secondary circuitry such as feature modules 108 or peripheral accessory loads, such as liquid crystal display (LCD) circuitry 130 or such as other secondary circuitry 132 (shown in phantom) over databus 133. The loop wiring contacts 126, 128 may be directly or indirectly coupled (via buffer circuitry within the feature module 102, for example) to process control loop wiring 106.

In the example of FIG. 1, the feature module 108 couples to the electrical connector 120, and includes a liquid crystal display (LCD) circuit 130, which is connected to the bus contact 122 and the common contact 124. LCD circuit 130 draws power and receives display information from the transmitter circuitry via the bus contact 122 and common contact 124. The liquid crystal display circuit 130 is adapted to display information to an operator in the field, such as the current value of the process variable sensed by the sensing module 112 or other data received from the transmitter circuitry within housing 110. The LCD circuit 130 can be installed locally, as illustrated, or can be installed in a location that is remote from the process variable transmitter 102 and convenient for viewing by an operator.

Field wiring 106 from a process monitoring and control center 104 connects to a two-wire output interface of the transmitter 102. The field wiring 106 carries a 4-20 mA current and is used for powering and communication with transmitter 102.

The current required for powering the transmitter circuitry and for communicating with the monitoring and control center can be referred to as quiescent current. In one embodiment, the quiescent current must be less than 3.6 mA. A standard established by NAMUR (Normenarbeitsgemeinschaft für Mess- und Regeltechnik der chemischen Industrie) specifies that to indicate an alarm low condition for the transmitter 102, the current on the 4-20 mA loop should decrease to 3.6 mA. Since field devices adapted for Highway Addressable Remote Transmitter (HART®)-based communications use approximately ±0.5 mA for signaling on the two-wire loop 106, 3.1 mA of current is allocated to the transmitter circuitry for the quiescent current budget.

However, given that the current in the two-wire loop varies from 4 mA (minimum) to 20 mA (maximum), conventional transmitters discard up to 82% of their available power when the loop current is at a maximum. Specifically, the ratio of power consumed by the transmitter (given the quiescent current requirements of 3.1 mA plus 0.5 mA communication current) to available power (when the two-wire loop current is at its maximum of 20 mA) can be calculated as follows:

$$\frac{(20\text{mA} - 3.6\text{mA})}{20\text{mA}} = 0.82. \qquad (1)$$

Embodiments of the present invention are adapted to limit the current provided to secondary circuitry to a current level that is within quiescent current budget. For example, current on the two-wire loop 106 in excess of the quiescent current can be provided to the secondary circuitry for use in powering secondary circuit loads and in communicating with the secondary circuitry.

Figure 2A:
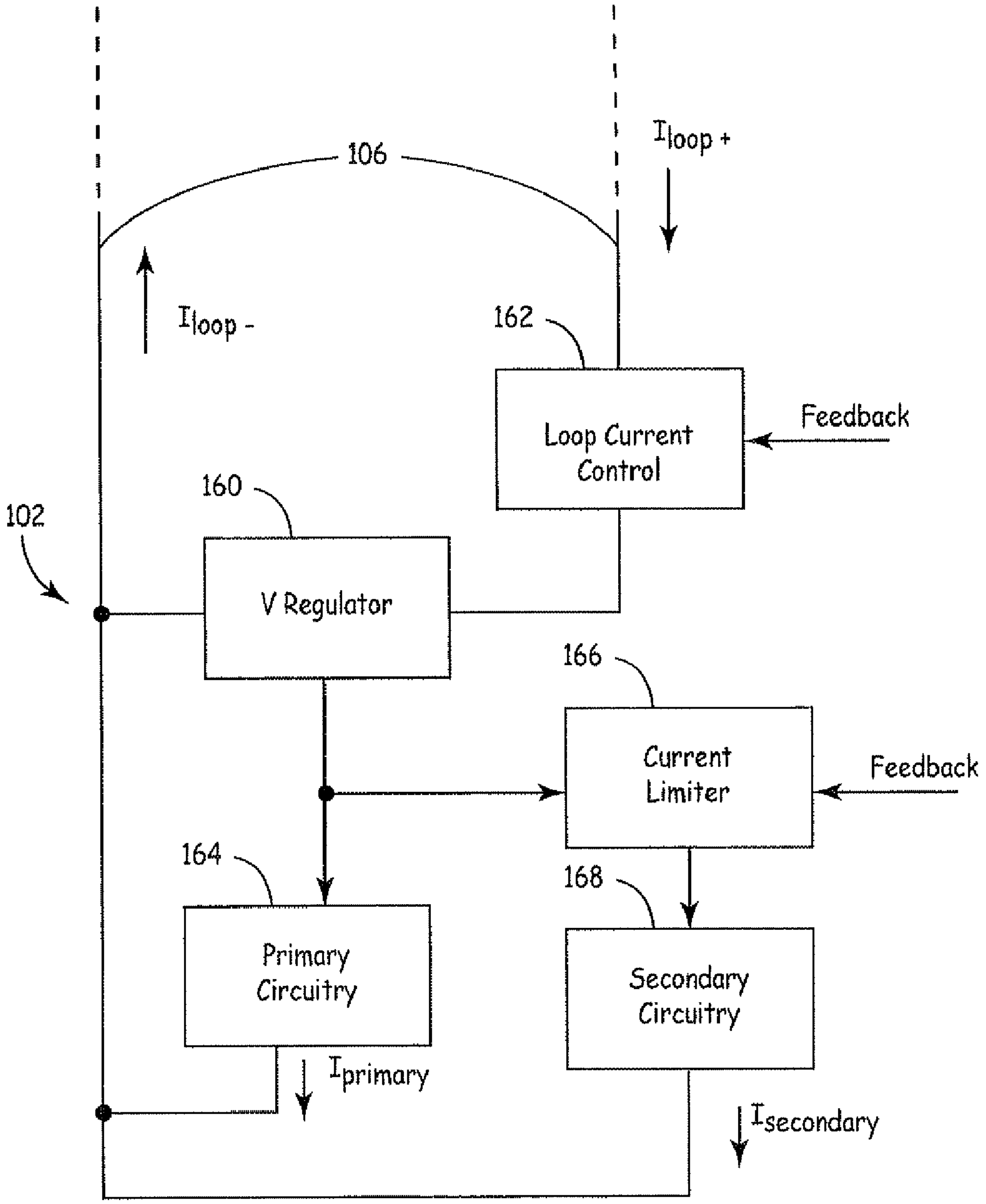
FIGS. 2A and 2B are simplified block diagrams of a process transmitter with a current limiter circuit according to an embodiment of the present invention.

FIG. 2A is a simplified block diagram of one configuration of process control transmitter 102 in which a voltage regulator 160 and a series loop current control circuit 162 are coupled in series with process control loop 106. Voltage regulator 160 provides a regulated voltage output to primary circuitry 164 and current limiter 166. The current limiter 166 provides a limited current level to secondary circuitry 168. Current ($I_{Primary}$) and ($I_{SecondaryMax}$) from primary circuitry 164 and primary circuitry 168, respectively, are returned to the process control loop 106. Primary circuitry can comprise any of the circuits used in transmitter 102. In one example, primary circuitry 164 comprises a microprocessor or the like along with additional circuitry used to sense process variables and/or transmit information related to sense process variables. In such a configuration, the microprocessor can be used to control a control current limiter circuitry 166 to modulate delivery of current to secondary circuitry 168. During operation, loop current control 162 receives a feedback signal and is configured to control the current ($I_{Loop}$) flowing through process control loop 106. Current limiter 166 also receives a feedback signal and, as discussed above, is configured to limit the current delivered to secondary circuitry 168 as a function of the available quiescent current.

Figure 2B:
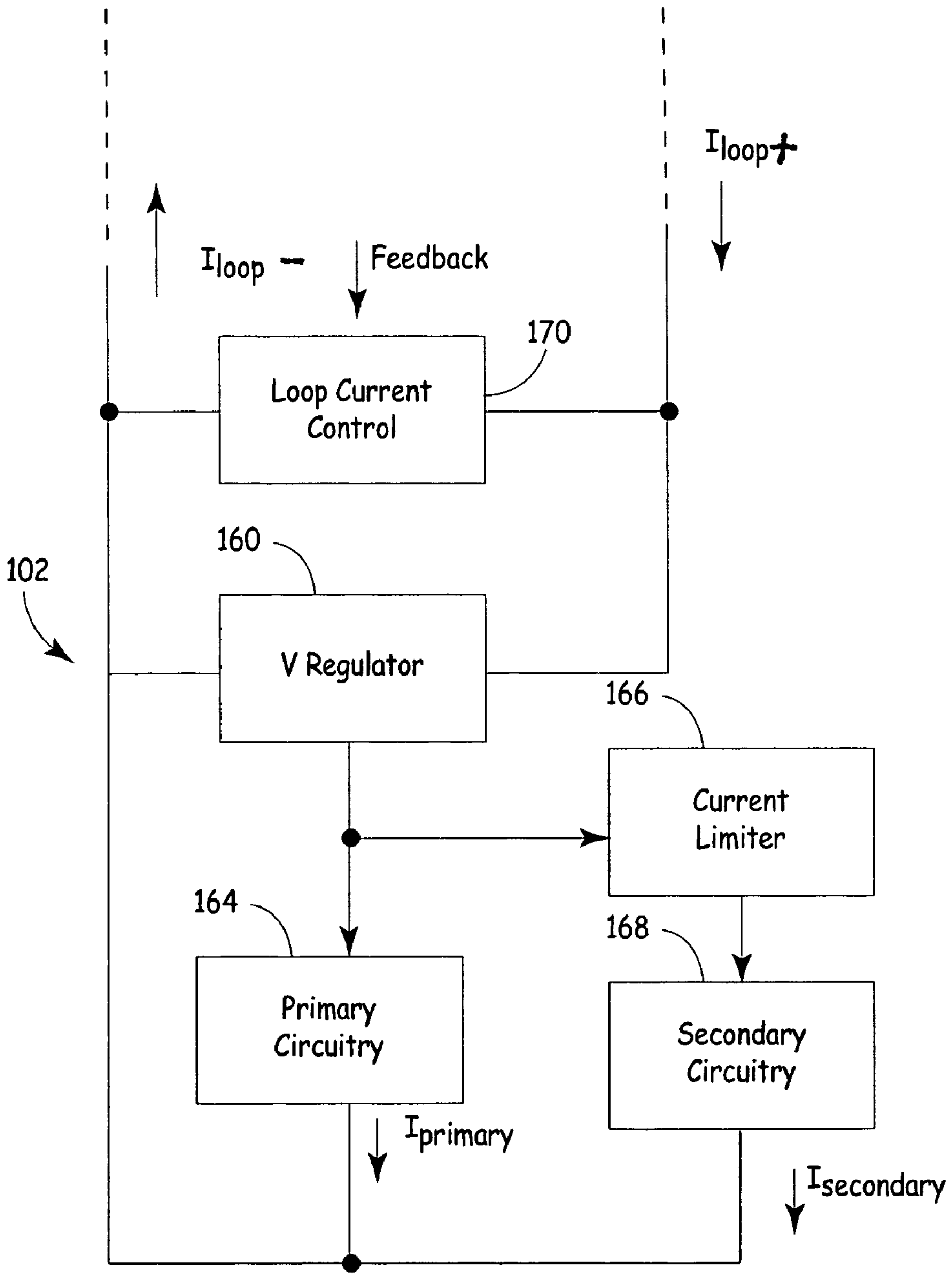

FIG. 2B is a simplified block diagram of transmitter 102 in a similar configuration in which series loop current control 162 is replaced with a shunt loop current control 170. In both the configurations of FIGS. 2A and 2B, the current limiter 166 limits the current supplied to secondary circuitry based upon a difference between the available circuit loop ($I_{Loop}$) and the current required by primary circuitry and the current ($I_{Primary}$) required by primary circuitry 164. The current ($I_{SecondaryMax}$) provided to secondary circuitry 168 can also be limited based upon the signaling overhead ($I_{SignalingOverhead}$) which is required to modulate a digital signal onto process control loop 106. For example, the current required for a single measurement and to keep the 4-20 mA electronics and sensor circuitry functioning is up to about 3.6 mA, which is low enough to meet NAMUR alarm levels. Since HART®-based transmitters use plus or minus 0.5 mA for signaling on the two-wire process control loop 106, the voltage regulator 160 provides a quiescent current level as low as 3.1 mA to the primary circuitry. The maximum secondary (excess) current ($I_{SecondaryMax}$) represents a value less than a difference between the loop current ($I_{Loop}$), the primary circuit current ($I_{Primary}$) and any signal overhead ($I_{SignalingOverhead}$) as follows:

$$I_{SecondaryMax} = I_{Loop} - I_{Primary} - I_{SignalingOverhead} \qquad (2)$$

Figure 3:
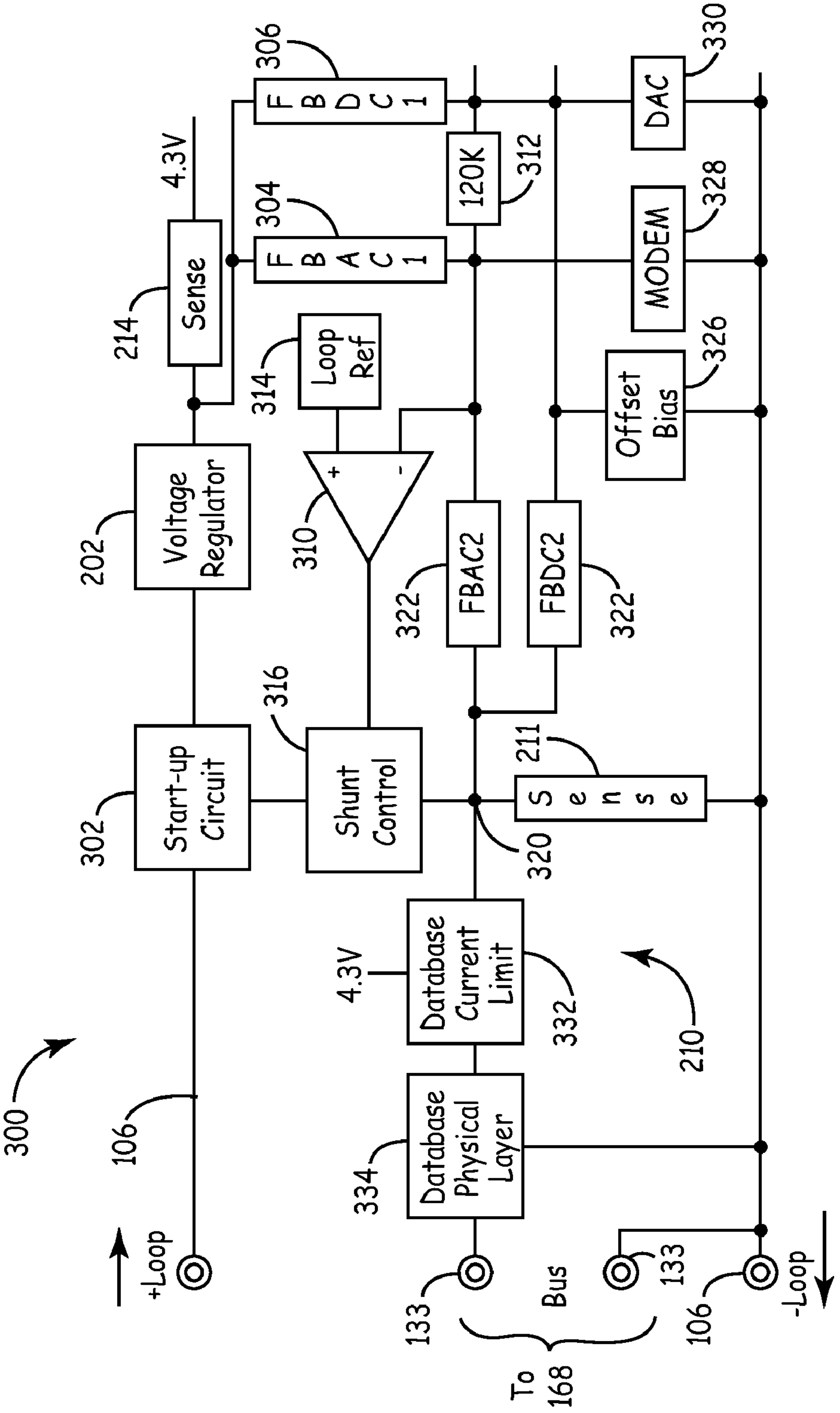
FIG. 3 is a simplified block diagram of the process transmitter of FIG. 2B is greater detail.

FIG. 3 is a more detailed block diagram of circuitry 300 of the transmitter in accordance with the present invention. In this example, the current ($I_{Loop}$) is controlled using a shunting technique.

Circuitry 300 shows the connection to a two-wire process control loop 106 and includes start-up circuit 302 configured to provide an initial power boost to initiate operation of the transmitter. An AC feedback element 304 and DC feedback element 306 are configured to provide negative feedback to operational amplifier 310. The DC feedback element 306 couples to operational amplifier 310 through a 120 k ohm resistance 312. The non-inverting input of operational amplifier 310 couples to a loop reference value 314. A shunt control circuit 316 couples to process control loop 106 and receives a feedback input from operational amplifier 310. At a summing node 320, a voltage is generated based upon a sense resistance 211, the voltage at the output from shunt control 316, a second AC feedback element 322 and a second DC feedback element 324. Circuitry 300 also illustrates an offset bias voltage 326 and a modem 328 which affect the voltage at summing node 320. A digital to analog converter 330 can be used to control the analog current level through loop 106. A databus current limit circuit 332 receives an input from summing node 320 and couples to databus physical layer 334. In one specific configuration, the databus provided by databus physical layer 334 is in accordance with the CAN (Controller Area Network) protocol.

During operation, the databus current limit circuitry 332 limits the available current provided over databus 133. This limiting function is based upon the voltage of summing node 320 and a fixed minimum current level which can be conservatively provided to the databus. The voltage of summing node 320 is controlled based upon shunt control circuitry 316 in accordance with the requirements set forth above such that the total current provided to secondary circuitry 168 does not exceed a desired current budget.

Current limiting circuit 332 diverts some or all of the excess current (in excess of the quiescent current needs of the primary circuitry 206 and any additional overhead such as required for signaling) from the process control loop 106 to the secondary circuitry 168. The excess or secondary current provides power to the secondary circuitry 168 for taking measurements, displaying data, or performing other functions, depending on the specific implementation. More or less current is available to the bus 133 depending on the unused or excess current output of the transmitter 102. The secondary bus current can be managed to enable the secondary circuitry 168 to provide faster updates under certain loop current conditions (such as when the loop current is greater than 4 mA). Conversely, the bus current can be managed to provide less current to the bus 133, when the loop current is low. In some instances, the low current delivery to the bus 133 reduces the frequency with which the secondary circuitry 168 takes measurements. If the transmitter 102 is adapted for HART®-based communications, the shunt control 316 can increase or decrease the excess current to the bus 133 or to the transmitter circuitry 206 based on the HART® signal. For example, a portion of the HART® signal can be diverted to supplement either the quiescent current level or the excess current level, as needed.

With the present invention, the voltage regulator provides one example of a power connection which provides power to primary circuitry of the process transmitter which is derived from the loop current. However, any type of power connection can be used and the invention is not limited to the disclosed voltage regulator. The secondary current control circuit is configured to dynamically limit the current delivered to secondary circuitry. In other words, the current limit is not set to a fixed value but is variable. In general, the secondary current control has an adjustable input which is used to dynamically limit the current which can be delivered to the secondary circuitry. The current can be limited based upon the excess current which is related to the loop current and the quiescent current level drawn by primary circuitry. The loop current can be inferred based upon operation of the transmitter or can be measured directly by using analog or digital circuitry. The quiescent current level can also be inferred based upon transmitter operation, can be measured directly using analog or digital circuitry or can be estimated using a fixed value. The operation of the secondary circuitry can be changed based upon the available current. For example, if the secondary circuitry is measuring a process variable or performing a calculation, the update rate or the clock of the secondary circuitry can be controlled based upon the available current. In general, the performance or functionality of the secondary circuitry can adaptively change based upon the available current. The current limiting circuitry also provides electrical isolation between the secondary circuitry and the primary circuitry. For example, if the secondary circuitry fails, such as develops a short circuit which increases current draw, the current limiting circuit will prevent this increased current draw from negatively affecting the primary circuitry.

Although the present invention has been described with reference to preferred embodiments, workers skilled in the art will recognize that changes may be made in form and detail without departing from the spirit and scope of the invention. The secondary circuitry of the present invention can be any appropriate secondary circuitry including local displays such as LCD circuitry, measurement circuitry adapted to monitor a secondary process parameter or process variable, a local operator interface adapted to receive inputs from an operator, etc. Another example secondary circuit comprises includes secondary communication circuitry adapted to communicate with the field device over a communications bus. In one configuration, when communication occurs using the HART® communication protocol, the current provided to the secondary circuitry is limited dynamically by plus and minus 0.25 mA during respective positive and negative portions of the HART® transmit signal such that 3.35 mA quiescent current can be accommodated, instead of 3.1 mA, and still meet NAMUR alarm level low (3.6 ma) conditions on the loop.

What is claimed is:

1. An industrial process transmitter for transmitting a process variable on a two-wire process control loop, the industrial process transmitter comprising:

a loop current control coupled to the two-wire process control loop and adapted to control a loop current level on the two-wire process control loop that is related to the process variable;

a power supply connection coupled to the loop current control and adapted to provide power to primary circuitry of the process transmitter at a quiescent current level and which is derived from the loop current;

a databus configured to couple to secondary circuitry of the industrial process control transmitter;

a secondary current control circuit having an input coupled to the power supply and an output coupled to the secondary circuitry, the secondary current control circuit adapted to provide current to the secondary circuitry from the power supply and to limit current delivered to secondary circuitry from the power supply as a function of an adjustable input; and wherein the secondary current control circuitry is adapted to adjust current delivered to the secondary circuitry by a positive and a negative amount during respective positive and negative portions of a signal transmitted using a digital communication protocol.

2. The apparatus of claim 1 wherein the adjustable input is related to the loop current level.

3. The apparatus of claim 2 further comprising:

a sense resistor coupled to the secondary current circuit control and adapted to provide the adjustable input to the secondary current control circuit related to the loop current level.

4. The apparatus of claim 3 wherein the current level provided by the secondary circuitry is related to a voltage across the sense resistor.

5. The apparatus of claim 1 wherein the adjustable input is related to excess current based upon the loop current and the quiescent current level.

6. The apparatus of claim 5 including measurement circuitry configured to measure the loop current and the excess current.

7. The apparatus of claim 5 wherein the quiescent current is based upon a fixed value.

8. The apparatus of claim 1 wherein the quiescent current level is 3.6 mA and wherein current on the two-wire loop is controlled between 4 mA and 20 mA as a signal that is related to the process variable.

9. The apparatus of claim 1 further comprising:

a microprocessor coupled to the secondary current control circuit and adapted to modulate delivery of excess current to the secondary circuitry.

10. The apparatus of claim 1 wherein the secondary circuitry comprises:

a field device adapted to measure a secondary process parameter.

11. The apparatus of claim 1 wherein the secondary circuitry comprises:

an LCD circuit adapted to display information to an operator.

12. The apparatus of claim 1 wherein the secondary circuitry comprises:

measurement circuitry adapted to monitor a secondary process parameter.

13. The apparatus of claim 1 wherein the secondary circuitry comprises:

a local operator interface adapted to receive inputs from an operator.

14. The apparatus of claim 1 wherein the digital communication protocol comprises a digital signal comprises:

circuitry adapted to communicate with a control center over the two-wire loop in accordance with digital communication protocol modulated onto an analog signal.

15. The apparatus of claim 1 wherein the secondary circuitry comprises:

a secondary communications circuit adapted to communicate with a field device over a communications bus.

16. The apparatus of claim 15 wherein the communications circuit is adapted to communicate in accordance with Controller Area Network (CAN) protocols.

17. The apparatus of claim 1 wherein operation of the secondary circuitry changes based upon available current.

18. The apparatus of claim 17 wherein an update rate of the secondary circuitry is a function of available current.

19. The apparatus of claim 1 wherein the secondary current control circuit isolates secondary circuitry from primary circuitry.

20. A method for monitoring a process variable with an industrial process transmitter coupled to a two-wire process control loop, the method comprising:

sensing a process variable;

controlling a loop current level of the two-wire process control loop based on the process variable;

powering primary circuitry at a quiescent current level using power from a power supply coupled to the two-wire process control loop;

dynamically limiting current provided to secondary circuitry from the power supply based upon a feedback signal provided to secondary current control circuitry; and wherein the dynamically limiting current provided to the secondary circuitry comprises adjusting the current delivered to the secondary circuitry by a positive and a negative amount during respective positive and negative portions of a signal transmitted using a digital communication protocol.

21. The method of claim 20 wherein dynamically limiting current is a function between the loop current level and the quiescent current level.

22. The method of claim 20 further comprising:

reducing the current supplied to the secondary circuitry based upon the loop current.

23. The method of claim 20 wherein the step of limiting current to the secondary circuit comprises:

modulating current to the secondary circuitry in relation to a communication signal on the two-wire process control loop.

24. The method of claim 20 including communicating with the secondary circuitry over a databus.

25. The method of claim 20 including changing operation of the secondary circuitry based upon available current.

* * * * *